(12) United States Patent
Park et al.

(10) Patent No.: US 10,427,535 B2
(45) Date of Patent: Oct. 1, 2019

(54) METHOD AND APPARATUS FOR BATTERY MANAGEMENT

(71) Applicant: Samsung Electronics Co., Ltd., Suwon-si (KR)

(72) Inventors: Sang Do Park, Seoul (KR); Kae Weon You, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 15/360,522

(22) Filed: Nov. 23, 2016

(65) Prior Publication Data

US 2017/0144560 A1 May 25, 2017

(30) Foreign Application Priority Data

Nov. 24, 2015 (KR) .................. 10-2015-0165064

(51) Int. Cl.
| | | |
|---|---|---|
| *G01M 17/00* | (2006.01) | |
| *B60L 11/18* | (2006.01) | |
| *G01S 19/42* | (2010.01) | |
| *H02J 7/00* | (2006.01) | |
| *B60L 58/10* | (2019.01) | |

(52) U.S. Cl.
CPC .......... *B60L 11/1851* (2013.01); *B60L 58/10* (2019.02); *G01S 19/42* (2013.01); *H02J 7/0045* (2013.01); *B60L 2240/622* (2013.01); *B60L 2240/64* (2013.01); *B60L 2240/662* (2013.01); *H02J 2007/0096* (2013.01); *Y02T 10/7005* (2013.01); *Y02T 10/705* (2013.01); *Y02T 10/7291* (2013.01); *Y02T 90/16* (2013.01); *Y02T 90/162* (2013.01)

(58) Field of Classification Search
CPC ........... B60L 11/1851; B60L 2240/622; B60L 2240/64; G01R 31/36; G01S 19/42; H02J 7/0045; H02J 2007/0096
USPC .................. 701/32.3, 22; 702/63; 180/65.21; 903/903; 324/426
See application file for complete search history.

(56) References Cited

U.S. PATENT DOCUMENTS

| | | | |
|---|---|---|---|
| 7,554,296 B2 | 6/2009 | Mizuno et al. | |
| 7,583,059 B2 | 9/2009 | Cho | |
| 8,515,700 B2 | 8/2013 | Oh et al. | |
| 9,000,728 B2 | 4/2015 | Kamiya | |
| 2009/0055330 A1* | 2/2009 | Medasani | G01R 31/3606 706/2 |
| 2009/0326841 A1* | 12/2009 | Zhang | G01R 31/3651 702/63 |
| 2010/0036626 A1* | 2/2010 | Kang | G01R 31/3648 702/63 |

(Continued)

FOREIGN PATENT DOCUMENTS

| | | |
|---|---|---|
| JP | 9-236641 A | 9/1997 |
| JP | 2006-300692 A | 11/2006 |

(Continued)

*Primary Examiner* — Shardul D Patel
(74) *Attorney, Agent, or Firm* — NSIP Law (57) ABSTRACT

The present disclosure is related to a battery management system which includes a location information obtainer configured to obtain location information of a battery, and an estimation model changer configured to change an estimation model to estimate an internal state of the battery according to a change in the location information.

19 Claims, 10 Drawing Sheets

(56) References Cited

U.S. PATENT DOCUMENTS

| | | | |
|---|---|---|---|
| 2014/0107913 A1* | 4/2014 | Vicharelli | G01C 21/3469 701/123 |
| 2014/0277878 A1* | 9/2014 | Manickaraj | B60W 20/00 701/22 |
| 2014/0320144 A1* | 10/2014 | Nakaya | H01M 10/54 324/434 |
| 2015/0127199 A1* | 5/2015 | Zhao | B60L 11/1862 701/22 |
| 2015/0147608 A1* | 5/2015 | Lin | H01M 10/052 429/62 |
| 2015/0274028 A1* | 10/2015 | Payne | B60L 11/1861 701/22 |
| 2015/0314700 A1* | 11/2015 | Ahn | H02J 7/0013 320/128 |
| 2015/0323610 A1* | 11/2015 | Ahn | H02J 7/007 320/152 |
| 2015/0377978 A1* | 12/2015 | Mitsuyama | H01M 10/44 702/63 |
| 2016/0033582 A1* | 2/2016 | You | G01R 31/3637 324/427 |
| 2016/0114698 A1* | 4/2016 | Chow | B60L 11/1861 701/22 |
| 2016/0214500 A1* | 7/2016 | Kim | B60L 11/1861 |

FOREIGN PATENT DOCUMENTS

| | | |
|---|---|---|
| JP | 2010-45901 A | 2/2010 |
| JP | 2011-69693 A | 4/2011 |
| JP | 2012-16192 A | 1/2012 |
| JP | 2013-231441 A | 11/2013 |
| KR | 10-2005-0061386 A | 6/2005 |
| KR | 10-2006-0091269 A | 8/2006 |
| KR | 10-2012-0031611 A | 4/2012 |
| KR | 10-2013-0137738 A | 12/2013 |

* cited by examiner

| Loc. | Params |
|---|---|
| North America | W11=0.011, W12=0.232, W13=... |
| South America | W11=0.001, W12=0.222, ... |
| Norway | ... |

METHOD AND APPARATUS FOR BATTERY MANAGEMENT

CROSS-REFERENCE TO RELATED APPLICATION(S)

This application claims the benefit under 35 USC 119(a) from Korean Patent Application No. 10-2015-0165064, filed on Nov. 24, 2015, in the Korean Intellectual Property Office, the entire disclosure of which is incorporated herein by reference for all purposes.

BACKGROUND

1. Field

The following description relates to a battery management system for controlling a battery.

2. Description of Related Art

Battery state of health (SOH) is a percentage value obtained by comparing a current state of a battery with the most ideal state thereof. A battery management system (BMS) serves to estimate the battery SOH, and to recommend battery replacement when a current battery capacity is 80% or less of an initial capacity.

In a material parameter-based estimation technique as one technique for estimating the battery SOH, various approximations for state estimation are applied, and an estimation error value may be increased by them.

As another technique for estimating the battery SOH, a statistical training method may estimate a battery state using a lookup table and sensing data of a temperature, a voltage and a current inside the battery.

Meanwhile, when a remaining mileage of the battery is estimated using state information (temperature distribution data and mileage) of the battery, the battery SOH may be affected by not only the temperature or the mileage but also a peripheral temperature, a slope of a road and other battery use environments.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description relates to a battery management system for controlling a battery.

According to a general aspect, a battery management apparatus includes a processor configured to obtain location information of a battery; and to change an estimation model to estimate an internal state of the battery according to a change in the location information.

The battery management apparatus may include a memory storing instructions for execution.

The battery management apparatus may further include a location information obtainer configured to obtain location information of a battery, and an estimation model changer configured to change the estimation model to estimate an internal state of the battery according to a change in the location information.

The location information obtainer may be further configured to receive the location information from a global positioning system (GPS).

The location information obtainer may be further configured to periodically check for a change in the location information, or check for a change in the location information corresponding to a driving record of an electric vehicle (EV).

The estimation model may be an estimation model to estimate a battery state of health (SOH) based on one or more of a neural network (NN) and a deep neural network (DNN).

The estimation model changer may include an environment information obtainer which is configured to obtain local environment information corresponding to changed location information when the changed location information deviates from a region which is predefined in the estimation model.

The local environment information may be regional information, and include any one or any combination of two or more of environmental factors of temperature, humidity, weather, geography, road conditions, and city characteristics of a corresponding area.

The environment information obtainer may be further configured to obtain the local environment information through a battery charging cable.

The environment information obtainer may be further configured to communicate with a server using any one or any combination of two or more of WiFi, Zigbee, near field communication (NFC), Bluetooth, and radio frequency (RF), and obtains the local environment information from the server.

The estimation model changer may be further configured to establish the obtained local environment information as environment information of the estimation model.

According to another general aspect, a method for battery management, includes obtaining a location information of a battery; and changing an estimation model to estimate an internal state of the battery according to a change in the location information.

The obtaining of the location information may receive the location information for the battery from a global positioning system (GPS).

The obtaining of the location information may include periodically checking for a change in the location information, or checking for a change in the location information corresponding to a driving record of an electric vehicle (EV) which includes the battery.

The estimation model may be an estimation model to estimate a battery state of health (SOH) based on either one or both of a neural network (NN) and a deep neural network (DNN).

The changing of the estimation model may include obtaining local environment information corresponding to changed location information when the changed location information deviates from a region which is predefined in the estimation model.

The local environment information may be region information, and may include any one or any combination of two or more of environmental factors of temperature, humidity, weather, geography, road conditions, and city characteristics of a corresponding area.

The obtaining of the local environment information may obtain the local environment information through a battery charging cable.

The obtaining of the local environment information may obtain the local information from a server by communicating with the server using any one or any combination of any two or more of WiFi, Zigbee, near field communication (NFC), Bluetooth, and radio frequency (RF).

The method may be stored on a non-transitory storage medium.

The changing of the estimation model may establish the obtained local environment information as environment information of the estimation model.

Other features and aspects will be apparent from the following detailed description, the drawings, and the claims.

Throughout the drawings and the detailed description, unless otherwise described, the same drawing reference numerals should be understood to refer to the same elements, features, and structures. The drawings may not be to scale, and the relative size, proportions, and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

A battery management apparatus 100 estimates a battery state of health (SOH) of a battery cell, a battery module, or a battery pack in an electric vehicle (EV), a plug-in hybrid EV (PHEV), and a hybrid EV (HEV), and manages a battery. Hereinafter, embodiments of the battery management apparatus 100 and a method for battery management will be described in detail with reference to the accompanying drawings.

Figure 1:
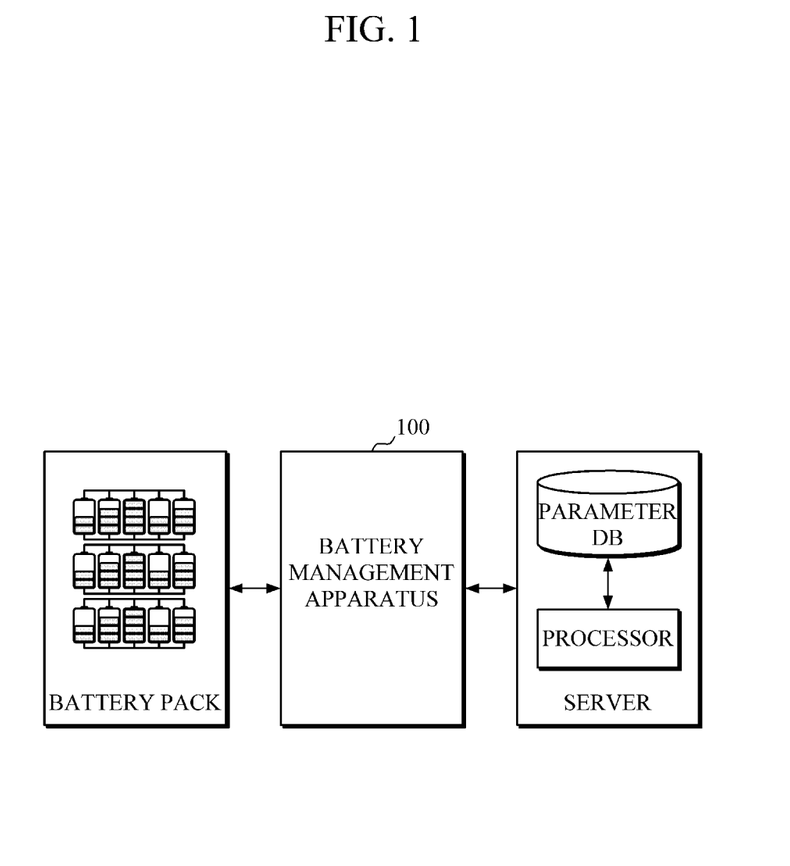
FIG. 1 is a diagram illustrating an example of a relationship among a battery management apparatus, a battery pack, and a server.

FIG. 1 is a diagram illustrating an example of a relationship among the battery management apparatus 100, a battery pack and a server. The battery management apparatus 100 collects data about the battery pack from a sensor provided at the battery pack, and estimates battery state of charge (SOC) and battery SOH as an internal state of the battery using the collected data.

Also, the battery management apparatus 100 obtains information about a battery use environment from an external server. According to one embodiment, the server includes a parameter database (DB) about an estimation model for estimating the battery SOH, and a processor. The battery management apparatus 100 communicates with the server, and obtains a parameter set about the estimation model for estimating the battery SOH.

A battery in an EV is an expendable unit having a replacement time period. Even in identical batteries, there may be a difference in a battery life according to a service condition of the EV and a battery use environment. The battery management apparatus 100 estimates the battery SOH based on information about the battery use environment, diagnoses a defect of the battery, and calculates the replacement time of the battery from the estimation.

Figure 2:
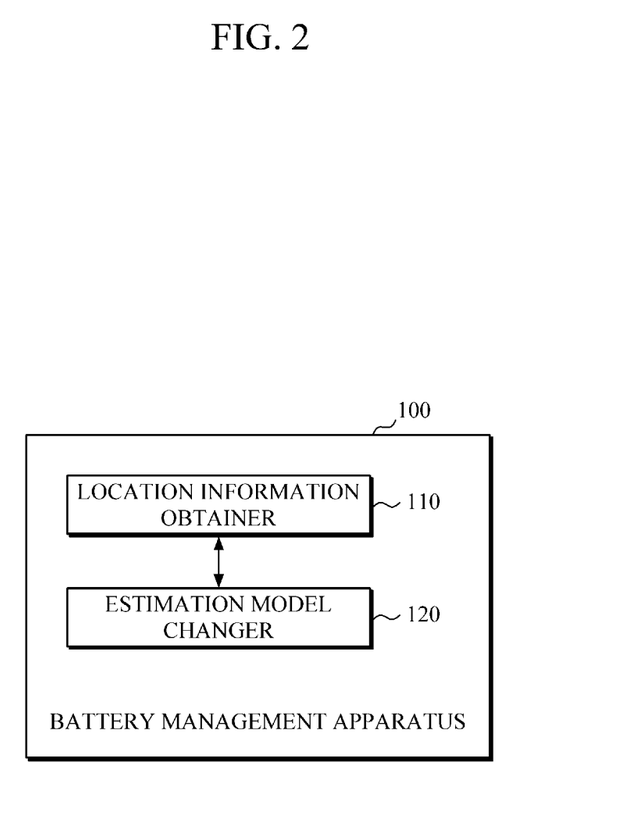
FIG. 2 is a block diagram of a battery management apparatus 100 according to one embodiment.

FIG. 2 is a block diagram of the battery management apparatus 100 according to one embodiment. The battery management apparatus 100 according to one embodiment includes a location information obtainer 110 and an estimation model changer 120.

The location information obtainer 110 obtains location information. For example, in the case of the battery in the EV, the location information obtainer 110 obtains the location information of the EV using a global position system (GPS) connected to the EV. However, in addition to the described embodiment, the location information obtainer 110 obtains the location information through a WiFi repeater, a mobile communication network, or the like.

For example, the location information obtainer 110 periodically checks for a change in the location information. As another example, the location information obtainer 110 reactively checks for a change in the location information corresponding to a driving record based on the driving record of the EV.

The estimation model changer 120 changes an estimation model for estimating the internal state of the battery according to the change in the location information. For example, the estimation model changer 120 changes the estimation model for estimating the battery SOH. The estimation model is an estimation model for estimating the battery SOH based on one or more of a neural network (NN) and a deep neural network (DNN).

The estimation model changer 120 reflects the battery use environment based on a regional characteristic according to the change in the location information, and establishes environment information of the estimation model. For example, when local environment information including temperature data corresponding to the changed location information is obtained, the estimation model changer 120 establishes the obtained temperature data as the environment information of the estimation model for estimating the battery SOH.

A severity level of the battery may be considerably affected by an environment in which the EV is used. For example, when the EV is used in one of a downtown area, a desert area, a tropical area, and an extremely cold area, the severity level of the battery may be calculated differently in each environment. When the EV is moved to another area in which the battery use environment is different, a different environment information about the battery use environment of the estimation model according to the changed location information is established.

The environment information is regional information, and includes one or more environmental factors of temperature, humidity, weather, geography, road conditions, and city characteristics of a corresponding area. For example, the environment information includes the temperature data. Also, when geographic information is obtained through the GPS or the like, the environment information includes information of a condition and a slope of a road, or the like, on which the EV is driven. In addition to this, the environment information includes various types of information on the battery use environment.

Figure 3:
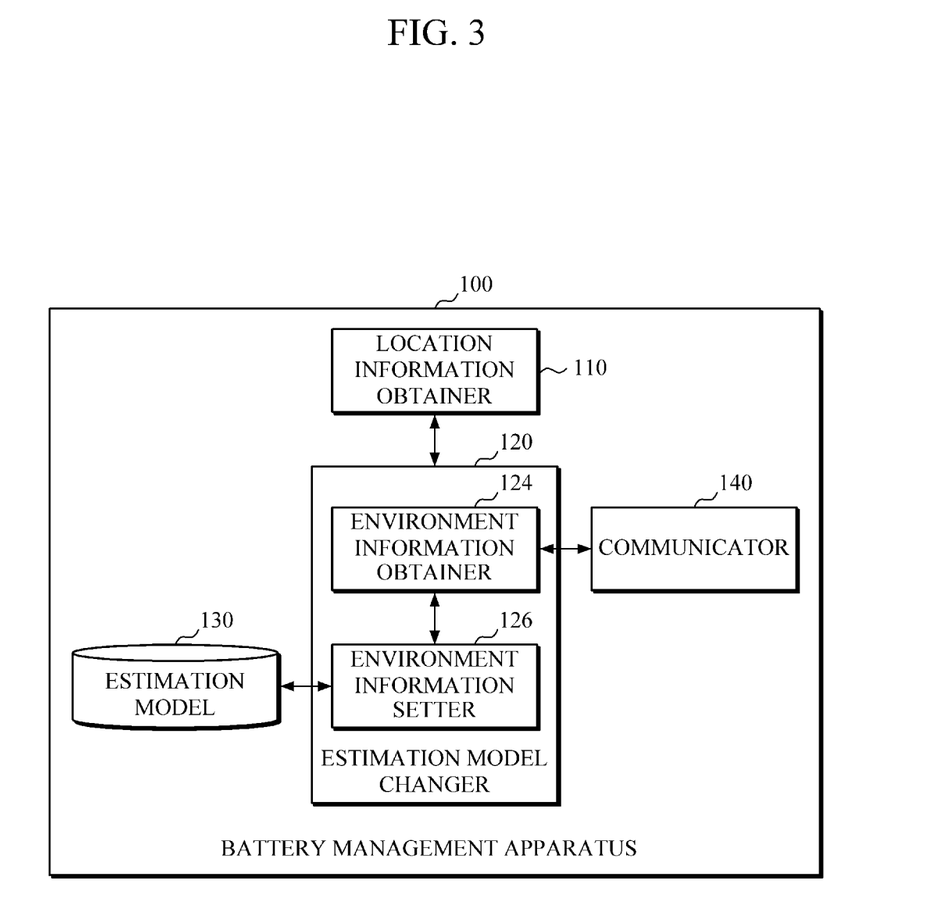
FIG. 3 is a detailed block diagram of the battery management apparatus 100 according to one embodiment.

FIG. 3 is a detailed block diagram of the battery management apparatus 100 according to one embodiment. Referring to FIG. 3, the battery management apparatus 100 according to one embodiment includes the location information obtainer 110, the estimation model changer 120, an estimation model 130 and a communicator 140. Hereinafter, description of configurations overlapping with or similar to those in FIG. 2 will be omitted.

Referring to FIG. 3, the estimation model changer 120 includes an environment information obtainer 124 and an environment information setter 126.

When changed location information deviates from a region which is established in the estimation model 130, the environment information obtainer 124 obtains local environment information corresponding to the changed location information.

According to one embodiment, the environment information obtainer 124 obtains the local environment information through a battery charging cable. For example, when the EV charges the battery, the environment information obtainer 124 obtains the local environment information of the corresponding area through the charging cable (a charging protocol).

According to another embodiment, the environment information obtainer 124 communicates with a server using any one or any combination of two or more of wireless communication methods such as WiFi, Zigbee, near field communication (NFC), Bluetooth, and radio frequency (RF), and obtains the local environment information corresponding to the location information from the server. For example, the environment information obtainer 124 obtains the local environment information corresponding to the location information through home WiFi, a gateway, or a wireless communication network.

The environment information obtainer 124 may download a parameter set indicating the local environment information from the external server through the communicator 140 using wired or wireless communication methods. Also, the environment information obtainer 124 stores a parameter set of the estimation model 130 in a local model parameter directory.

The environment information obtainer 124 communicates with an external server through wired or wireless communication methods using the communicator 140. The server includes a lookup table or a database (DB) in which a parameter set applicable to the estimation model 130 is stored. Here, the external server is not specific physical hardware, but may be an apparatus or a device from which the environment information obtainer 124 obtains data.

The environment information setter 126 establishes the obtained environment information as the environment information of the estimation model. For example, the environment information setter 126 establishes the parameter set, which is the battery use environment, in the estimation model based on a NN.

The battery is an analog device and may have various degradation patterns according to a user's use pattern and a use environment, and covering all of the use patterns through an initial setting is actually quite difficult. In regards to factors which should be considered in the estimation of the battery SOH, the battery management apparatus 100 changes the environment information so as to consider other environment factors which are not recognized in advance. Also, the battery management apparatus 100 estimates the battery SOH in consideration of the battery use environment outside the battery based on the location information, and thus enhances accuracy of the estimation of the battery SOH.

The estimation model 130 estimates an internal state of the battery. For example, the estimation model for estimating the battery SOH estimates the battery SOH through data sensed from an inside of the battery. Meanwhile, an outside battery use environment may also affect the battery SOH, and when outside environment information is input to the estimation model, the battery SOH is more accurately estimated.

The estimation model 130, according to an embodiment, is an estimation model for estimating the battery SOH based on one or more of a NN and a DNN.

Meanwhile, the estimation model 130 is an estimation model for estimating the battery SOC, and estimates the SOC inside the battery using the environment information about the obtained battery use environment. A type of the estimation model 130 is not limited, and various estimation models 130 for battery management may be used according to various embodiments.

Figure 4:
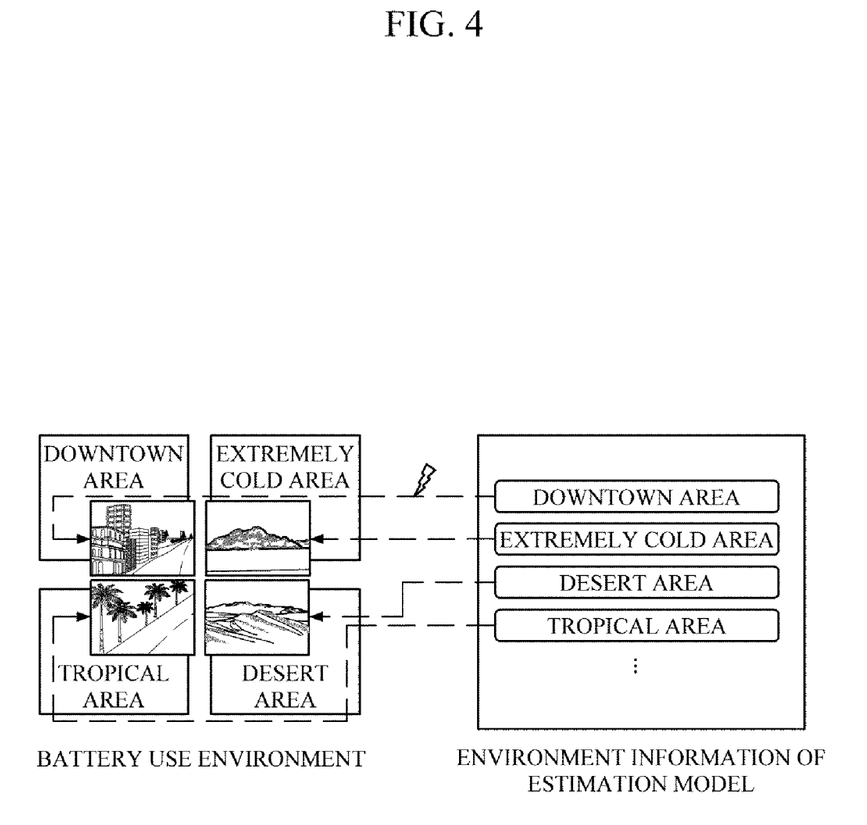
FIG. 4 is a diagram illustrating an example of regional climate features.

FIG. 4 is a diagram illustrating an example of regional climate features. Referring to FIG. 4, there is illustrated an example of regional characteristics, such as a downtown area, an extremely cold area, a tropical area, and a desert area, which are battery use environments. According to one embodiment, the battery management apparatus 100 reflects local environment information, on which each of the regional characteristics are reflected, on the estimation model.

For example, an EV may be driven even in environments such as the extremely cold area which is very cold, the tropical area which is very hot and humid, and the desert area which is very hot and dry. However, such battery use environments may irregularly tax or overburden the battery in the EV, and thereby affect the battery SOH.

As an example, in the case in which an EV runs 100,000 km in the downtown area having a good driving environment, and the case in which an EV runs 100,000 km in the desert area, the severity level of a battery in the EV driven in the desert area may be higher. The battery SOH is a factor related to the battery life. Accurately estimating the battery SOH provides for an accurate estimate of the replacement time of the battery. The accuracy of the battery SOH is enhanced by estimating the battery SOH in consideration of the battery use environment.

As another example, the desert area has a climate which is hotter than a critical value and also a very dry humidity level. Local environment information includes temperature data and humidity data which correspond to the area of interest. Because the desert area has a high peripheral temperature, a battery cooling system should be further operated, and thus the battery SOH may also be estimated to be larger.

Meanwhile, the regional information may be an administrative district, a border, an ecoregion, a predetermined regional unit or the like, but is not limited thereto, and may be set differently in various methods.

Figure 5:
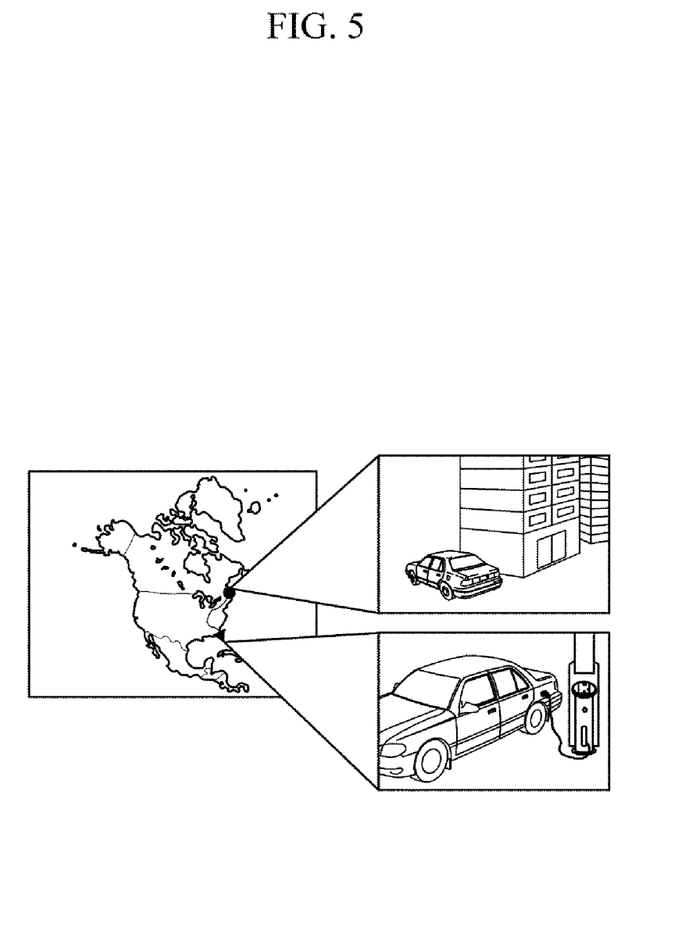
FIG. 5 is a diagram illustrating an example of obtaining local environment information according to a change in location information.

FIG. 5 is a diagram illustrating an example of obtaining local environment information according to a change in location information. For example, an EV may be driven to another area having different environmental factors, and the location information obtainer 110 obtains location information from the GPS. Referring to FIG. 5, an example is illustrated in which local environment information is obtained in different areas through WiFi or the charging cable.

As an example, the estimation model changer 120 obtains the local environment information corresponding to the location information from an external server through home WiFi. The external server includes, for example, a meteorological office, a local broadcasting station, a portal site, an EV manufacturer, or the like, and may be various other sources.

The estimation model changer 120 obtains the local environment information corresponding to the location information in real time, and checks for a change in the location information. Also, the estimation model changer 120 checks for a change in the location information by reactively obtaining local environment information corresponding to location information on a driving record based on the driving record of the EV during that time at a certain point.

As an example, the estimation model changer 120 is set so as to obtain the environment information using WiFi of a certain area. In this case, when the EV drives for a short or long period of time in some place having different regional environments and then comes back, the local environment information corresponding to the location information on the driving record during that time is obtained using WiFi.

As another example, the environment information obtainer 124 obtains the local environment information corresponding to the area before and after charging the battery. A battery charging station includes a parameter storage location or a relay server which downloads a parameter set of an estimation model. In this case, the environment information obtainer 124 downloads the parameter set of the estimation model through the charging cable.

Figure 6:
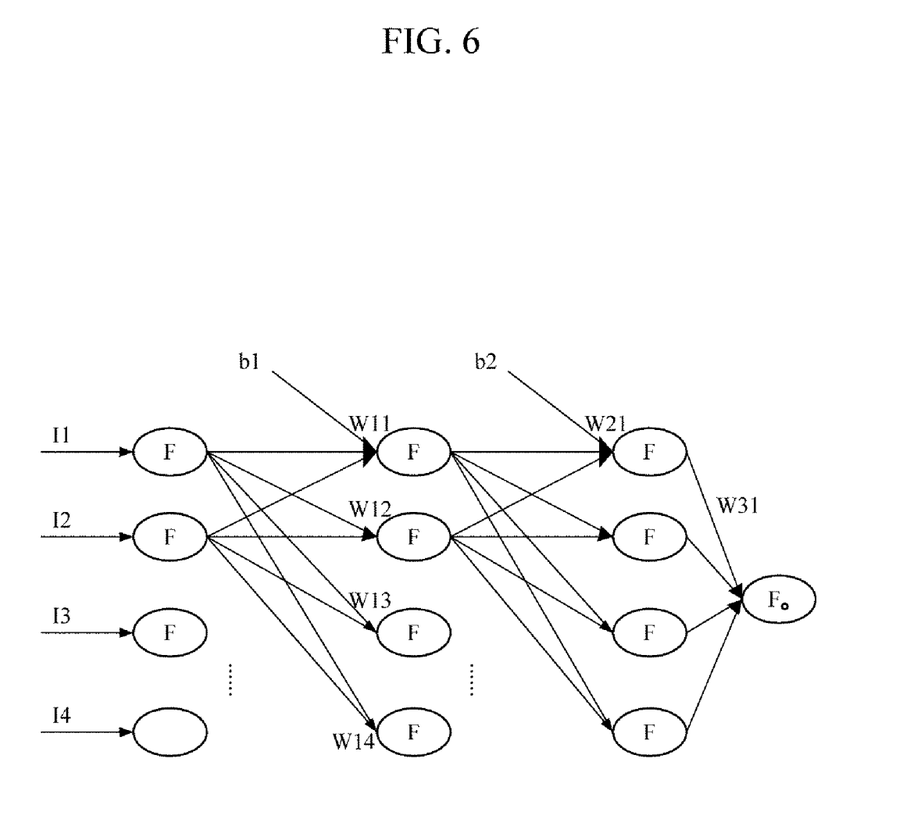
FIG. 6 is a diagram illustrating an example of an estimation model based on a neural network.
Figure 7:
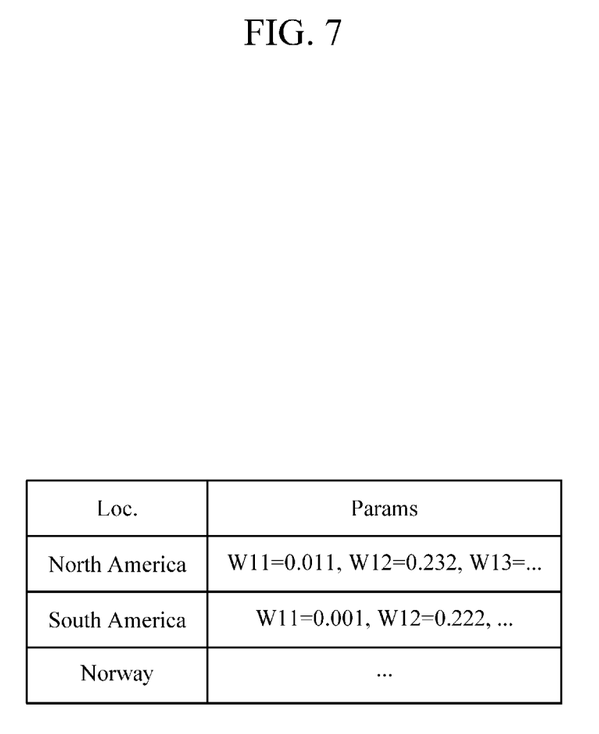
FIG. 7 is a diagram illustrating an example of a parameter set of each regional estimation model.

FIG. 6 is a diagram illustrating an example of an estimation model based on a NN, and FIG. 7 is a diagram illustrating an example of a parameter set. Referring to FIG. 6, in the estimation model based on a NN, input signals 11, 12, 13 and 14 are input to an input node F (Function), and when biases b1 and b2 are applied to a plurality of hidden layers, an estimated value of the battery SOH is output through an output node $F_o$. At this point, the estimation model changer 120 establishes parameters indicating environment information, e.g., parameters such as W11, W12, W13, W14, W21 and W31 of FIG. 6 in each node F (Function).

Referring to FIG. 7, an example of the parameter set of an estimation model indicating environment information of each area is illustrated. For example, in the case of North America, the parameter set of the estimation model is W11=0.011, W12=0.232, W13= . . . . As another example, in the case of South America, the parameter set of the estimation model is W11=0.001, W12=0.222, . . . . Similarly, there may also be a parameter set corresponding to local environment information for each area in another area such as Norway. However, this is just an example, and the parameter set is not limited and construed to the proposed embodiment, but includes battery use environment information which indicates temperature data, humidity data, and other pertinent parameters of a corresponding area.

Figure 8:
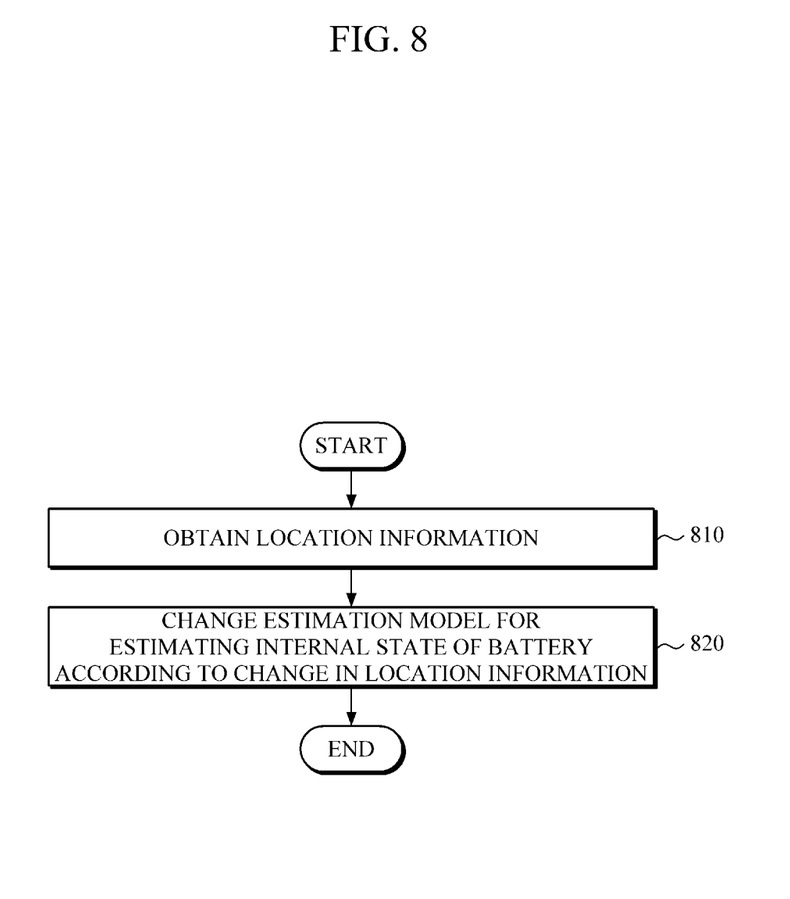
FIG. 8 is a flowchart illustrating a method for battery management according to one embodiment.

FIG. 8 is a flowchart illustrating a method for battery management according to one embodiment. Hereinafter, the method for battery management is described with reference to FIG. 8.

First, the location information obtainer 110 obtains location information (S810). For example, in the case of a battery in an EV, the location information obtainer 110 obtains location information of the EV using the GPS connected to the EV. However, in addition to the proposed embodiment, the location information obtainer 110 obtains the location information through WiFi, a repeater, a mobile communication network or other suitable data transmission measures.

Then, the estimation model changer 120 changes an estimation model for estimating an internal state of the battery according to a change in the location information (S820). For example, the estimation model changer 120 changes the estimation model for estimating the battery SOH. The estimation model is an estimation model for estimating the battery SOH based on one or more of a NN and a DNN.

The estimation model changer 120 reflects a battery use environment based on regional characteristics, and establishes environment information of the estimation model. For example, when local environment information including temperature data corresponding to changed location information is obtained, the estimation model changer 120 establishes the obtained temperature data as the environment information of the estimation model for estimating the battery SOH.

The environment information is regional information, and includes one or more environmental factors of temperature, humidity, weather, geography, road conditions, and city characteristics of a corresponding area. For example, the environment information is the temperature data. Also, when geographic information is obtained through the GPS or the like, the environment information includes information of the condition and slope of a road, or the like, on which the EV is driven. In addition to this, the environment information includes various types of information on the battery use environment.

Figure 9:
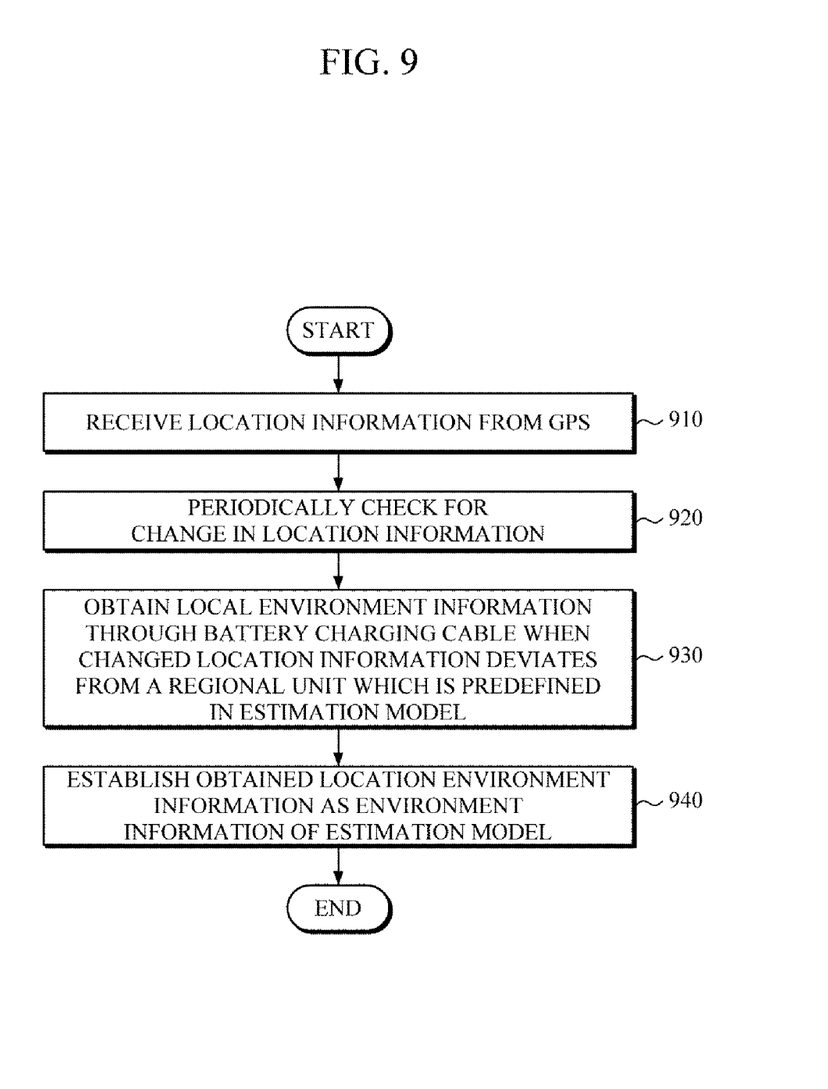
FIG. 9 is a detailed flowchart illustrating a method for battery management according to one embodiment.
Figure 10:
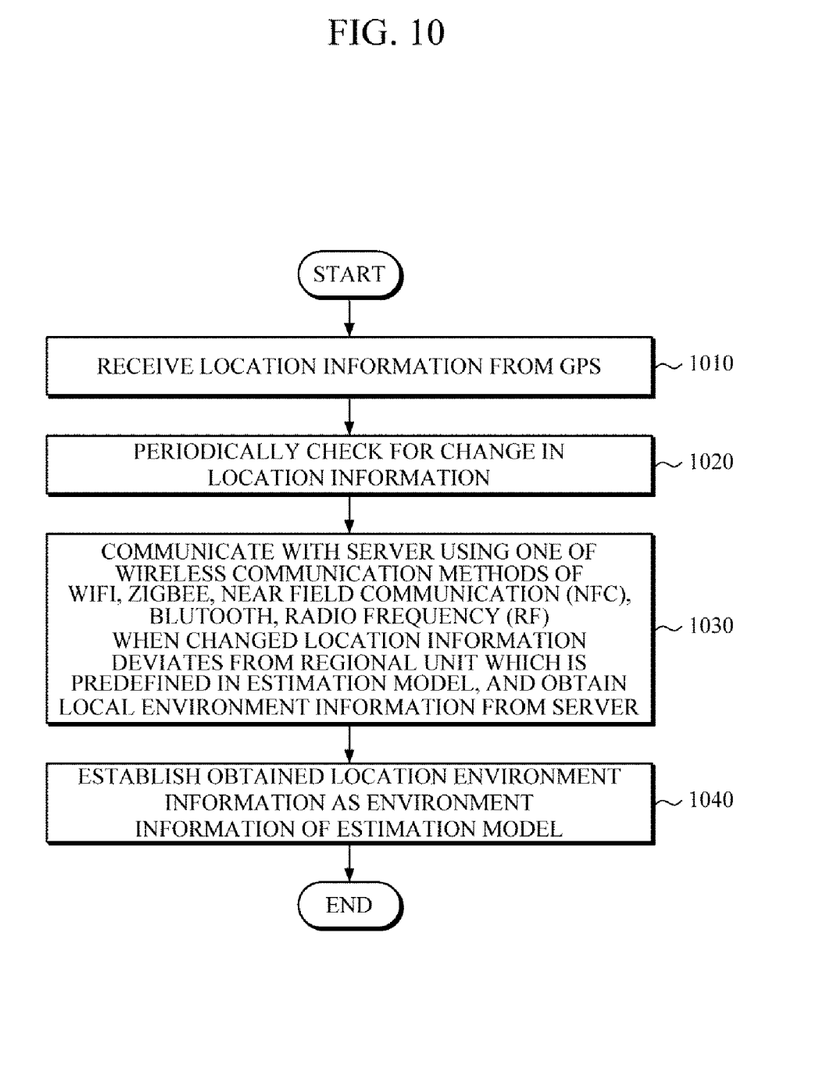
FIG. 10 is a detailed flowchart illustrating a method for battery management according to another embodiment.

FIGS. 9 and 10 are detailed flowcharts illustrating methods for battery management according to embodiments. Hereinafter, the method of battery management will be described with reference to FIGS. 3, 9 and 10, and repeated operations will be described briefly for clarity and conciseness.

First, the location information obtainer 110 receives location information from the GPS (S910 and S1010).

Then, the location information obtainer 110 periodically checks for a change in the location information (S920 and S1020). As another example, the location information obtainer 110 reactively checks for a change in the location information corresponding to a driving record based on the driving record of an EV.

Referring to FIG. 9, when changed location information deviates from a region which is predefined in the estimation model 130, the environment information obtainer 124 obtains local environment information through the battery charging cable (S930). For example, when the EV charges the battery, the environment information obtainer 124 obtains the local environment information of the corresponding area through the charging cable (a charging protocol).

Referring to FIG. 10, when the changed location information is deviated from the region which is predefined in the estimation model, the environment information obtainer 124 communicates with a server using one of wireless communication methods such as WiFi, Zigbee, NFC, Bluetooth, 4G, LTE, and RF, and obtains the local environment information corresponding to the location information from the server. (S1030). For example, the environment information obtainer 124 obtains the local environment information corresponding to the location information through home WiFi, a gateway, a wireless communication network, or the like.

At this point, the server includes a lookup table or a DB in which a parameter set applicable to the estimation model 130 is stored. Here, an external server is not specific physical hardware, but may be an apparatus or a device from which the environment information obtainer 124 obtains data.

Meanwhile, the environment information obtainer 124 downloads the parameter set indicating the local environment information from the external server through the communicator 140 using wired or wireless communication methods. Also, the environment information obtainer 124 stores the parameter set of the estimation model 130 in the local model parameter directory.

Then, the environment information setter 126 establishes the obtained environment information as the environment information of the estimation model (S940 and S1040). For example, the environment information setter 126 establishes the parameter set which will be applied to the estimation model based on a NN.

The battery is an analog device and may have various degradation patterns according to a user's use pattern and a use environment, and covering all of the use patterns through an initial setting is difficult. In regards to factors which should be considered in the estimation of the battery SOH, the battery management apparatus 100 changes the environment information so as to consider other environment factors which are not recognized in advance. Also, the battery management apparatus 100 estimates the battery SOH in consideration of a battery use environment outside the battery based on the location information, and thus enhances the accuracy of the estimation of the battery SOH.

The location information obtainer 110, estimation model changer 120, environment information obtainer 124, environment information setter 126, and communicator 140 in FIGS. 1-3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 8-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management apparatus, comprising: a processor configured to: obtain a state of health (SOH) estimation model configured to estimate a SOH of a battery based on regional information; determine location information of the battery using measured data from a sensor; determine updated regional information corresponding to the location information, in response to the location information being determined to deviate from a region predefined in the SOH estimation model; update the SOH estimation model based on the updated regional information; generate an updated SOH of the battery being estimated using the updated SOH estimation model; and calculate a replacement time of the battery using the updated SOH of the battery generated from the estimation.

2. The apparatus of claim 1, wherein the processor is further configured to determine the location information using the measured data from a global positioning system (GPS).

3. The apparatus of claim 1, wherein the processor is further configured to periodically check for a change in the location information, or to check for a change in the location information based on a driving record of an electric vehicle (EV).

4. The apparatus of claim 1, wherein the estimation model estimates the SOH of the battery based on either one or both of a neural network (NN) or a deep neural network (DNN).

5. The apparatus of claim 1, wherein the regional information comprises any one or any combination of any two or more environmental factors of temperature, humidity, weather, geography, road conditions, or city characteristics of a local area.

6. The apparatus of claim 1, wherein the processor is further configured to determine the updated regional information using data obtained through a charging cable of the battery.

7. The apparatus of claim 1, wherein the processor is further configured to obtain the regional information from a remote server.

8. The apparatus of claim 1, wherein the processor is further configured to recommend to a user to replace the battery when a value of the updated SOH is less than a health threshold.

9. The apparatus of claim 1, wherein the SOH estimation model is further configured to indicate a usage environment of the battery based on initial location information.

10. The apparatus of claim 1, wherein the processor is further configured to:
obtain internal data of an inside of the battery; and
generate the updated SOH based on the internal data, using the updated estimation model.

11. A processor-implemented method for battery management, the method comprising:
obtaining a state of health (SOH) estimation model configured to estimate a SOH of a battery based on regional information;
determining location information of the battery using measured data from a sensor;
determining updated regional information corresponding to the location information, in response to the location information being determined to deviate from a region predefined in the SOH estimation model;
updating the SOH estimation model based on the updated regional information;
generating an updated SOH of the battery being estimated using the updated SOH estimation model; and
calculating a replacement time of the battery using the updated SOH of the battery generated from the estimation.

12. The method of claim 11, wherein the obtaining of the location information comprises determining the location information of the battery using the measured data from a global positioning system (GPS).

13. The method of claim 11, wherein the determining of the location information comprises either one or both of periodically checking for a change in the location information, or checking for a change in the location information based on a driving record of an electric vehicle (EV) which includes the battery.

14. The method of claim 11, wherein the estimation model estimates the SOH of the battery based on either one or both of a neural network (NN) or a deep neural network (DNN).

15. The method of claim 11, wherein the regional information comprises any one or any combination of any two or more environmental factors of temperature, humidity, weather, geography, road conditions, or city characteristics of a local area.

16. The method of claim 11, wherein the determining of the updated regional information comprises updating the updated regional information using data obtained through a charging cable of the battery.

17. The method of claim 11, wherein the determining of the updated regional information comprises updating the updated regional information using data obtained from a server by communicating with the server using any one or any combination of any two or more of WiFi, Zigbee, near field communication (NFC), Bluetooth, or radio frequency (RF).

18. A non-transitory computer-readable storage medium storing instructions that, when executed by a processor, cause the processor to perform the method of claim 11.

19. A processor-implemented method for battery management, the method comprising:
  obtaining a state of health (SOH) estimation model configured to estimate a SOH of a battery based on regional information;
  determining location information of the battery using measured data from a sensor;
  determining updated regional information corresponding to the location information, in response to the location information being determined to deviate from a region predefined in the SOH estimation model;
  updating the SOH estimation model based on the updated regional information to estimate an updated SOH of the battery using the updated SOH estimation model; and
  calculating a replacement time of the battery using the updated SOH of the battery generated from the estimation.

* * * * *